United States Patent [19]

Opprecht et al.

[11] Patent Number: 4,495,397
[45] Date of Patent: Jan. 22, 1985

[54] PROJECTION FOR RESISTANCE WELDING OF SOFT METALS

[75] Inventors: Paul Opprecht, Herrenbergstr. 10, 8962 Bergdietikon; Jürg Opprecht, Widen, both of Switzerland

[73] Assignee: Paul Opprecht, Bergdietikon, Switzerland

[21] Appl. No.: 310,511

[22] Filed: Oct. 13, 1981

Related U.S. Application Data

[63] Continuation-in-part of Ser. No. 227,711, Jan. 23, 1981, abandoned.

[30] Foreign Application Priority Data

Feb. 11, 1980 [CH] Switzerland ................. 1121/80
Nov. 26, 1980 [CH] Switzerland ................. 8739/80
Sep. 15, 1981 [CH] Switzerland ................. 5948/81

[51] Int. Cl.³ ............................................ B23K 11/14
[52] U.S. Cl. ................................... 219/93; 219/86.1
[58] Field of Search ............... 219/93, 94, 92, 86.1

[56] References Cited

U.S. PATENT DOCUMENTS 3,988,562 10/1976 Becker .......................... 219/93

FOREIGN PATENT DOCUMENTS 2737692 3/1979 Fed. Rep. of Germany ........ 219/93

OTHER PUBLICATIONS

S. A. Westgate and R. M. Rivett, Research Report, The Welding Institute, "Effect of Projection Design When Welding Single Projections in Aluminium Autobody Sheet", 3/1979.
American Society for Metals; *Metals Handbook,* vol. 6, Welding and Brazing; 1971; pp. 444-445.

*Primary Examiner*—Roy N. Envall, Jr.
*Assistant Examiner*—Alfred S. Keve
*Attorney, Agent, or Firm*—Werner W. Kleeman

[57] ABSTRACT

A projection for use in electrical resistance welding of sheet metals and thin-wall parts, a method of fabricating such projection and the use of the same are disclosed. The flanks of the projection possess internally thereof an angle of about 40° to 75° and externally an angle of about 40° to 100°, and the strength of the material at the region of the flanks is about 50% greater than the strength of the neighboring basic material. The method of forming the projection contemplates fabricating the same through plastic deformation of the basic material and the dimensionally exact shaping is accomplished by compression molding of the flowable metal between a punch and die of a tool.

14 Claims, 9 Drawing Figures

PROJECTION FOR RESISTANCE WELDING OF SOFT METALS

CROSS REFERENCE TO RELATED CASE

This is a continuation-in-part application of our commonly assigned copending U.S. application Ser. No. 06/227,711, filed Jan. 23, 1981, now abandoned.

BACKGROUND OF THE INVENTION

The present invention relates to an improved design of projection for use in electrical resistance welding of sheet metal and thin-wall parts, a method of fabricating such projection and to the use of such projection.

During the mass production of parts by resistance welding it is projection welding of ferrous metals which constitutes one of the most widespread used welding techniques for obtaining high quality connections. In contrast to spot welding during projection welding the expanse or extent of the weld connection is not governed by the cross-sectional area of the electrode, rather by the cross-sectional area of the projection. On the one hand, there is thus exactly defined and maintained constant the welding surface and therefore the current path, the current density and the surface compression and, on the other hand, there also exists the possibility of simultaneously welding a multiplicity of projections and under exactly the same conditions and of preventing current shunts.

In the case of non-ferrous metals, especially, aluminium and aluminium alloys, it is not possible to positively perform the known projection welding when working with thin sheets. This is predicated upon the fact that aluminium, in contrast to iron, opposes the welding current with considerably less electrical resistance and at the same time appreciably better conducts the thermal energy which is produced by the current, and hence, conducts such away from the site which is to be welded. A further difficulty in addition thereto is that upon application of the force needed for welding at the workpiece, i.e. the projection, it is necessary for such to be larger than in the case of iron and such projection collapses before the current can be turned-on. If there is used a smaller electrode force then the projections can score or burn before there arises the actual welding operation because at the contact region between the projection and sheet metal there is present too great resistance.

Therefore it has already been proposed to undertake measures wherein the electrode is applied extremely gently at the workpiece and by means of an adjustable timing mechanism the complete electrode force is first then applied directly prior to the presence of the welding current.

Also in the case of machines working with program controls for the mutual timewise coordination of the course of the current and pressure the heretofore known methods have not up to now enabled any satisfactory randomly reproducible projection welding for the mass production of parts.

Equally, in the pertinent more recent publications, for instance "Resistance Welding Manual", Volume 1, page 44 and Aluminium-Taschenbuch 13, Aufl. 1974, page 581, there is repeatedly mentioned that projection welding of aluminium can not be positively carried out. Significant in this respect is also the work of S. A. Westgate and R. M. Rivett, entitled "Effect of Projection Design when Welding Single Projections in Aluminium Autobody Sheet", March 1979, 89/1979, of the Welding Institute. Nonetheless while a further publication authored by Pfeifer, entitled "Fachkunde des Widerstandsschweissens", states broadly at page 44 thereof that projection welding of light metals is possible "with suitable machines", yet there is not given any specific teaching as to how such type welding is capable of being performed.

From the prior art publications and from practice it is known to weld aluminium with embossed projections and this technique also has been found to be useful. Embossed projections only can be provided at solid parts, for instance handle projections or extensions of pans; at sheet metal parts or other thin-wall parts it is totally impossible to economically produce solid projections.

SUMMARY OF THE INVENTION

Therefore, with the foregoing in mind it is a primary object of the present invention to overcome the aforementioned drawbacks and limitations prevailing in the projection welding art.

Another and more specific object of the present invention is to provide a novel construction of projection by means of which it is possible to positively projection weld sheets formed of aluminium, aluminium alloys and the like, especially for performing multiple projection welding.

A further important object of the invention is to provide a new and improved method of fabricating a projection used in resistance welding and which projection design is extremely suitable for industrial mass production.

Another significant object of the present invention is to weld aluminium and aluminium alloys with a minimum expenditure of energy and with minimum loading of the power network.

Still a further significant object of the invention resides in providing projection weld connections of aluminium and aluminium alloys so as to have essentially metallurgically faultless structure and reproducibility.

Now in order to implement these and still further objects of the invention, which will become more readily apparent as the description proceeds, the invention contemplates a projection for the electrical resistance welding of sheet metals or sheets, wherein the flanks of such projection internally possesses an angle of about 40° to 75°, preferably 45°±5°, and externally an angle of about 40° to 100°, preferably 45°±5°, and the strength of the material at the region of the flanks is in the order of about 50% greater than the strength of the neighboring base or basic material. It is particularly desirable if both angles are the same, and specifically amount to 45°±5°.

According to the invention the projection may be ring-shaped or annular and its central circular surface is located in the same plane as the neighboring base material. Further, the projection may have a substantially line-like configuration, in other words, can constitute a longitudinal projection.

There is also disclosed a method of fabricating an annular or longitudinal projection, especially a projection at sheets and thin-wall parts, wherein the projection is produced by plastic deformation of the base material and the dimensionally exact shaping is obtained by compression molding of the flowable metal between a punch and die of a tool.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
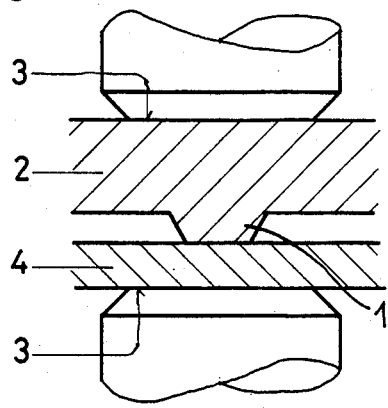
FIG. 1 is a sectional view through an embossed projection.

Describing now the drawings, in FIG. 1 there is shown a solid embossed projection 1 as the same can be produced at solid light metal workpieces 2 by deformation, for instance by embossing or by being affixed thereat. Such projections 1 are capable of withstanding the electrode force needed, on the one hand, for maintaining a uniform electrical transition resistance between the electrode surfaces 3 and the workpieces 2 and 4 to be welded and, on the other hand, between such workpieces 2 and 4.

Figure 2:
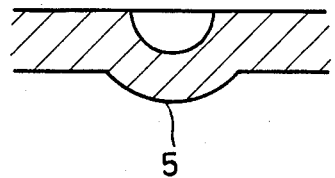
FIG. 2 illustrates in sectional view a conventional round projection.

FIG. 2 illustrates another conventional hollow embossed circular or round projection 5 as the same is generally employed for iron sheets. When working with light metals the projection 5 tends to collapse before the welding current can be turned-on and there cannot be produced a useful weld connection.

Figure 3:
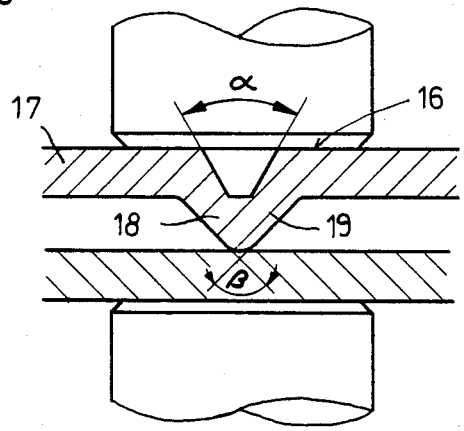
FIG. 3 is a cross-sectional view through a longitudinal projection.

FIG. 3 illustrates in cross-sectional view a longitudinal or substantially line-shaped or linearly extending projection 16 for aluminium and aluminium alloys which can be used for welding narrow flanges where there is not available sufficient space for an annular projection. Both of the flanks 18 and 19 have an approximately 50% greater strength than that of the base or basic material by virtue of the great plastic deformation of the base material 17 arising in the forming or shaping tool. The flanks 18 and 19 of the wedge-shaped projection 16 which is form pressed out of the base material 17, in other words the sheet metal, internally enclose an angle $\alpha$ of about 60° and externally an angle $\beta$ of about 90°.

Figure 4:
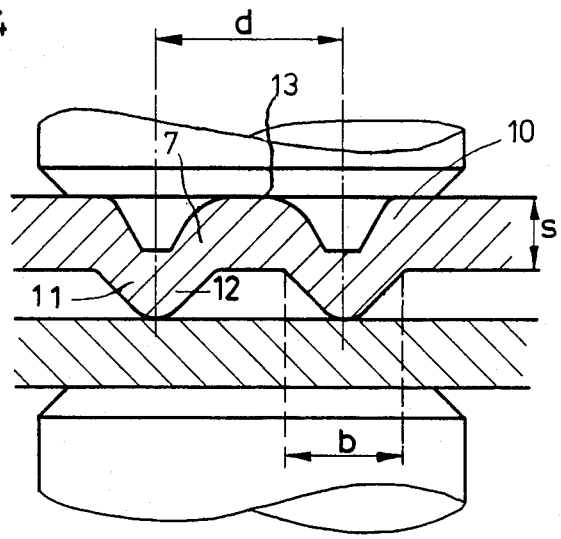
FIG. 4 is a sectional view through an annular or annular corrugated projection.

FIG. 4 illustrates a construction of an annular or annular corrugated projection 7 as the same has been found to be particularly advantageous for the welding of aluminium and aluminium alloys. The projection 7 distinguishes itself externally from the annular projections which are used when working with steel particularly by virtue of the smaller relationship $d/b \sim 1.5$ to 3 which, in this case, if desired, produces a completely welded nugget according to FIG. 9. In the foregoing equation d is the mean or intermediate diameter of the annular projection and b is the flange width.

At the regions 11 and 12 of the flanks there is also obtained for such projection configuration or shape, due to the deformation work, an increase in the strength of the base material by about 50%. Not merely the strength increase at the projection flanks 11 and 12, but rather with this shape particularly also the central circular surface 13 which remains locally unaltered in relation to the surrounding material 10, can transmit an appreciable portion of the electrode force to the inner flank 12 of the projection 7. The total electrode force therefore is uniformly distributed within the projection 7 over both of the flanks 11 and 12. The force lines in the projection 7 extend approximately parallel and are only slightly inclined with respect to the vertical through the welding plane. At the incipient phase of the compression of the projection 7 under the action of the electrode force F and the heating by virtue of the welding current I there is appreciably reduced the inclination of the force lines. The magnitude of the specific surface compression between the workpieces is essentially maintained.

Of course the diameter d of the projection 7 may not have any random size, since the welding current requirement increases approximately as the square of the diameter d. In the case of a sheet thickness amounting to 1.05 mm it has been found to be advantageous to provide a diameter $d=3$ mm and a projection height $h=0.7$ mm, for instance when working with a material AlMg 0.4 Si 1.2. A comparison with a circular projection having a height h of 1.1 mm and the same diameter d has shown that upon loading with a force $F=200$ daN of the projection of FIG. 2 there arises a permanent deformation of only 8% of h; on the other hand in the case of the circular projection there is present a permanent deformation of 54% of h.

Figure 7:
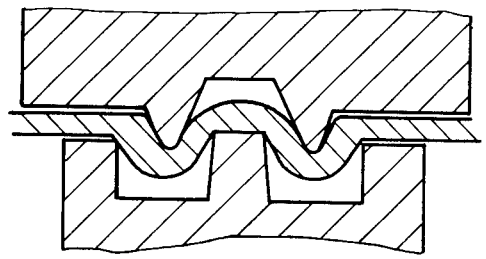
FIG. 7 is a sectional view taken through a conventional projection tool.
Figure 8:
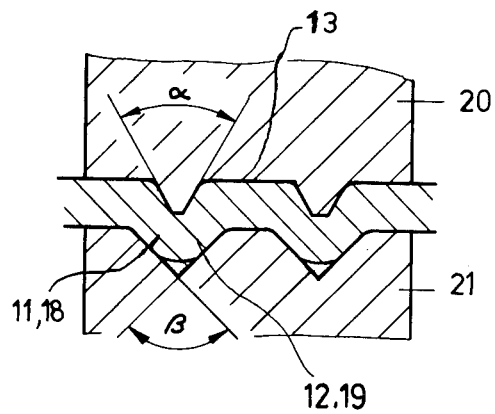
FIG. 8 is a sectional view through a projection tool for forming the projection shown in FIG. 3 or FIG. 4.

In contrast to the heretofore known mode of fabrication of the projections when working with iron materials, wherein such are freely flow formed (FIG. 7), the projections fabricated according to the invention are form pressed or compression molded (FIG. 8). The geometric shape of the projections, especially the flanks 11, 12 (FIG. 4) and 18, 19 (FIG. 3) is thus identical for all projections at a workpiece. The plastic deformation of the base material is accomplished with a shape-imparting punch 20 and a shape-imparting die 21.

In particular, it is not only possible to maintain by means of the forming or shaping tools 20 and 21 of FIG. 8, on the one hand, the angles $\alpha$ and $\beta$, rather these angles can be even first obtained and, on the other hand, the desired deformation and thus strengthening of the material at the flanks 11, 12 and 18, 19 can be produced. What is of significance is that in the case of an annular projection the central circular surface 13 possesses at least the level of the unaltered remaining surface of the sheet adjacent the projection. It has been found to be particularly advantageous to have both angles $\alpha$ and $\beta$ of the same magnitude, and in particular values of $\alpha$ and $\beta$ of each 45°±5° have to be preferred.

It should be apparent to those skilled in the art that a qualitatively good weld is not only solely dependent upon the shape or configuration of the projections, but rather also upon the material which is to be welded and the course as a function of time of the electrode force, and particularly the welding current plays an appreciable role.

The high thermal conductivity of aluminium and its alloys requires that the welding energy, i.e. the welding current be applied in an extremely short amount of time. In addition thereto there is present the fact that aluminium materials, for the stated reasons (high electrical conductivity, lower internal electrical resistance) as is well known require greater currents than iron materials.

Figure 5:
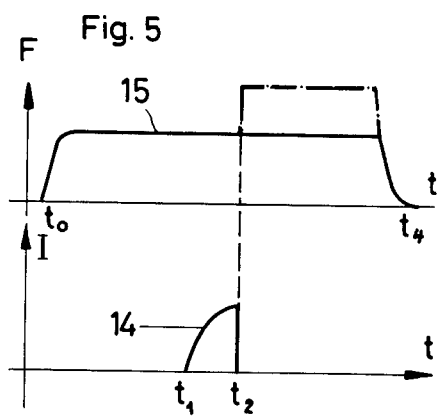
FIGS. 5 and 6 respectively show two graphs portraying the course of the current and force as a function of time.
Figure 6:
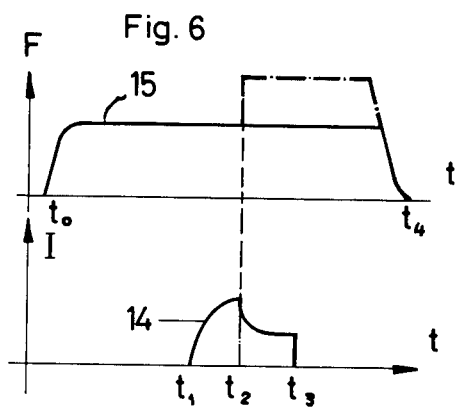
Figure 9:
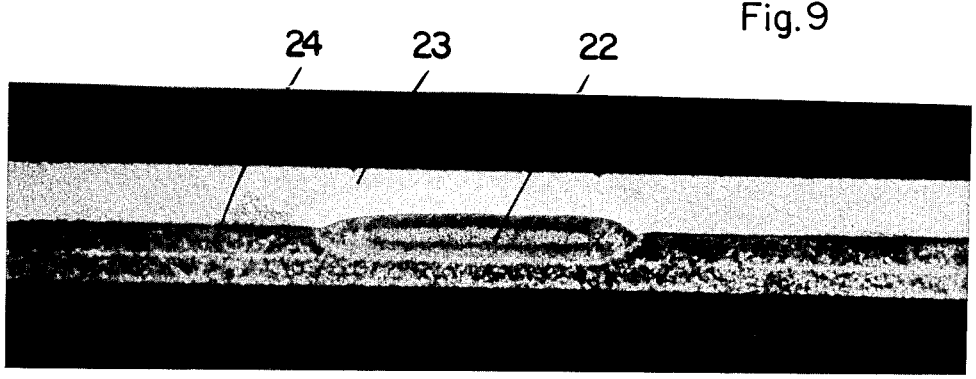
FIG. 9 is a sectional view showing a welding nugget of aluminium annular projection weld.

With the described construction of the projections in the forms shown in FIGS. 3 and 4 together with a course of the welding current and electrode force as shown in FIGS. 5 and 6 it is possible to produce in a most surprising manner qualitatively extremely upright, randomly reproducible weld connections according to the micrograph of FIG. 9.

In FIGS. 5 and 6 reference character 14 designates the current course during the time $\overline{t_1 t_2}$ and $\overline{t_1 t_3}$, respectively. Reference character 15 designates the course of the electrode force at the time $t_o$ to $t_4$. The current curve 14 of FIG. 6 possesses in relation to that of FIG. 5 a so-called post glowing or incandescence phase of $\overline{t_2 t_3}$. Such post incandescence phase can be useful or necessary when working with certain materials, in order to prolong the cooling time, and thus, to obtain an improved recrystalization. An additional increase of the welding pressure, demonstrated by the chain-dot course of the electrode force 15 shown in FIGS. 5 and 6, at the end of the welding phase contributes to preventing the formation of blow holes and fissures in the welding nugget.

FIG. 9 illustrates in cross-sectional view a welding nugget 22 of an annular projection weld between two sheet metal elements or sheets 23 and 24 of different aluminium alloys. In neither of both sheets 23 and 24 have the surfaces been freed of the oxide layer. Nonetheless the welding nugget is completely homogeneous, symmetrical and without inclusions. A further factor which is to be observed is the configuration of the electrode and its moved mass, upon which depends the so-called follow-up behaviour. The electrode must be able to follow the fusing or melting projection free of delay during the extremely short welding time $t_1 t_2$, in order to prevent any spattering away of the liquid material.

The electrodes are preferably designed so as to have large surface areas, so that between the workpiece and the electrode there appears a low current density, and thus, the electrode is subjected to extremely low wear. It is particularly advantageous to use a frequency converter-welding machine for performing the described welding operation. Through the use of direct current-like single pulse welding operation it is possible to apply to the workpiece the welding energy in the shortest amount of time.

During the simultaneous welding of a multiplicity of projections the electrodes are advantageously mounted to be movable and resiliently suspended, so that each individual projection can be impinged under exactly the same conditions with the electrode force and the welding current.

In contrast to the heretofore more or less positively carried out weld connection of aluminium and aluminium alloys, among other things, by spot welding, the inventive weld connection affords a multiplicity of advantages which, by way of example and not limitation, can be enumerated as follows:

(A) Production increase by a multiple because it is possible to simultaneously weld a plurality of projections without there being formed current shunts and there being required uneconomically high welding currents, and as a consequence of which there is obtained:

(i) uniform mechanical strength of the connections;
(ii) no change of the strength upon current fluctuations;
(iii) additional production increase since there is low negligible electrode contamination and wear by virtue of the lower current density at the contact location;
(iv) constant uniform welding quality due to the omission of alloy depositions at the electrode;
(v) proper position of the weld connection at the workpiece due to the prior formed projection; and
(vi) no cleaning of the oxidized sheet metal surfaces by pickling, brushing and so forth prior to welding.

While there are shown and described present preferred embodiments of the invention, it is to be distinctly understood that the invention is not limited thereto, but may be otherwise variously embodied and practiced within the scope of the following claims.

ACCORDINGLY,

What we claim is:

1. An electrical resistance welding projection at workpieces, such as sheets and thin-wall parts essentially consisting of a soft metal such as aluminum or aluminum alloy, wherein:
   said projection has flanks;
   said flanks of said projections internally enclosing an angle in the range of about 40° to 75° and externally an angle in the range of about 40° to 100°; and
   the strength of the material of the projection at the region of the projection flanks being greater by about 50% than the strength of neighboring base material of the workpiece at which there is present the projection.

2. The projection as defined in claim 1, wherein:
   each said internal angle and external angle amounts to 45°±5°.

3. The projection as defined in claim 1, wherein:
   each said internal angle and external angle are essentially of the same magnitude.

4. The projection as defined in claim 1, wherein:
   said projection has a substantially ring-shaped configuration; and
   said projection having a central circular surface located essentially in the same plane as the neighboring base material.

5. The projection as defined in claim 1, wherein:
   said projection has a substantially linearly extending configuration.

6. The projection as defined in claim 4, wherein:
   said central circular surface protrudes somewhat past the plane of the neighboring base material.

7. The projection as defined in claim 1, wherein:
   the internal angle amounts to about 60° and the external angle amounts to about 90°.

8. The projection as defined in claim 4, wherein:
   said projection comprises an annular projection; and
   the ratio of the mean diameter of the annular projection to the width of a flank is less than 3.

9. The projection as defined in claim 1, wherein:
   the mean strength of the flanks is about 50% greater than that of the base material.

10. The projection as defined in claim 1, wherein:
    said projection is formed by a recess at one side and a protuberance at the other side of the workpiece, which is to be electrically resistance welded; and said protuberance of the projection essentially retaining its configuration prior to application of welding current upon applying an electrode contact force which reduces the transfer resistance at electrodes used for the resistance welding operation.

11. The projection as defined in claim 10, wherein:
said protuberance is essentially undeformed prior to application of welding current.

12. The projection as defined in claim 10, wherein: said protuberance essentially does not collapse prior to application of welding current.

13. The projection as defined in claim 1, wherein:
the workpiece containing the projection is formed of aluminum.

14. The projection as defined in claim 1, wherein:
the workpiece containing the projection is formed of aluminum alloy.

* * * * *